US010293760B2

(12) United States Patent
Matori

(10) Patent No.: US 10,293,760 B2
(45) Date of Patent: May 21, 2019

(54) SENSOR BRACKET

(71) Applicant: HONDA MOTOR CO., LTD., Minato-ku, Tokyo (JP)

(72) Inventor: Tadahiro Matori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/006,875

(22) Filed: Jun. 13, 2018

(65) Prior Publication Data

US 2018/0361947 A1 Dec. 20, 2018

(30) Foreign Application Priority Data

Jun. 20, 2017 (JP) ................................ 2017-120540

(51) Int. Cl.
*B60R 11/04* (2006.01)
*G03B 17/56* (2006.01)
*H04N 5/225* (2006.01)

(52) U.S. Cl.
CPC ........... *B60R 11/04* (2013.01); *G03B 17/561* (2013.01); *H04N 5/2253* (2013.01)

(58) Field of Classification Search
None
See application file for complete search history.

(56) References Cited

U.S. PATENT DOCUMENTS

2005/0276599 A1* 12/2005 Kajino ................. H04N 5/2252 396/419
2012/0207461 A1* 8/2012 Okuda .................... B60R 11/04 396/419
2018/0361947 A1* 12/2018 Matori .................... B60R 11/04
2018/0364076 A1* 12/2018 Matori .................. G01D 11/30

FOREIGN PATENT DOCUMENTS

| | | |
|---|---|---|
| EP | 3173289 | 5/2017 |
| JP | 3163084 | 9/2010 |
| JP | 2016-016830 | 2/2016 |
| JP | 2016-203936 | 12/2016 |
| WO | 2018/092473 | 5/2018 |

OTHER PUBLICATIONS

Japanese Notice of Allowance for Japanese Patent Application No. 2017-120540 dated Oct. 16, 2018.

* cited by examiner

*Primary Examiner* — William B Perkey
(74) *Attorney, Agent, or Firm* — Amin, Turocy & Watson LLP

(57) ABSTRACT

A sensor bracket that holds a sensor having an engaging protrusion, the sensor bracket includes: a locking concave section to which a side surface of the engaging protrusion is locked in a abutting state, the side surface of the engaging protrusion being formed so as to cross with a protruding direction of the engaging protrusion; a displacement allowing section that is provided adjacent to the locking concave section, and that allows a displacement of the engaging protrusion during engaging and separating between the engaging protrusion and the locking concave section in a direction crossing with the protrusion direction of the engaging protrusion; and a movement restricting wall that is disposed below the displacement allowing section and that suppresses a downward movement of the engaging protrusion when the engaging protrusion is displaced during separation from the locking concave section.

3 Claims, 11 Drawing Sheets

SENSOR BRACKET

CROSS-REFERENCE TO RELATED APPLICATION

Priority is claimed on Japanese Patent Application No. 2017-120540, filed Jun. 20, 2017, the content of which is incorporated herein by reference.

BACKGROUND OF THE INVENTION

Field of the Invention

The present invention relates to a sensor bracket.

Description of Related Art

A sensor such as an on-vehicle camera or the like may be attached to a vehicle body-side member such as a glass windshield or the like via a separate sensor bracket (for example, see Japanese Unexamined Patent Application, First Publication No. 2016-16830).

The sensor bracket disclosed in Japanese Unexamined Patent Application, First Publication No. 2016-16830 includes a first bracket attached to the vehicle body-side member, and a second bracket configured to hold the on-vehicle camera (the sensor) together with the first bracket. The on-vehicle camera includes an engaging protrusion protruding laterally from a side surface, and the engaging protrusion is sandwiched between an L-shaped support wall of the first bracket and an elastic arm of the second bracket. The elastic arm is elastically deformed when the second bracket is assembled to the first bracket together with the on-vehicle camera and presses the engaging protrusion of the on-vehicle camera against the L-shaped support wall of the first bracket.

SUMMARY

However, since the sensor bracket in the related art has a structure in which the lower part of the engaging protrusion of the on-vehicle camera by the L-shaped support wall having a short extending width in the forward/rearward direction, when the on-vehicle camera is detached from the sensor bracket, if the elastic arm gets separated from the outer surface of the engaging protrusion, there is a concern that a sudden removal of the on-vehicle camera from the sensor bracket (support wall) may occur. Accordingly, as actual circumstances, the sensor bracket in the related art has poor workability when detaching the sensor (on-vehicle camera).

An aspect of the present invention is to provide a sensor bracket that allows to perform an easy attaching and detaching work of the sensor.

A sensor bracket according to the present invention employs the following configurations.

(1) A sensor bracket according to an aspect of the present invention is a sensor bracket that holds a sensor having an engaging protrusion, the sensor bracket including: a locking concave section to which a side surface of the engaging protrusion is locked in a abutting state, the side surface of the engaging protrusion being formed so as to cross with a protruding direction of the engaging protrusion; a displacement allowing section that is provided adjacent to the locking concave section, and that allows a displacement of the engaging protrusion during engaging and separating between the engaging protrusion and the locking concave section in a direction crossing with the protrusion direction of the engaging protrusion; and a movement restricting wall that is disposed below the displacement allowing section and that suppresses a downward movement of the engaging protrusion when the engaging protrusion is displaced during separation from the locking concave section.

According to the configuration of the above mentioned (1), when the sensor is detached from the sensor bracket, the sensor is relatively moved with respect to the sensor bracket, and the engaging protrusion of the sensor is displaced in a direction toward the displacement allowing section.

Accordingly, when the engaging protrusion is moved in the direction toward the displacement allowing section of the sensor bracket, a sudden movement of the engaging protrusion downward is suppressed by the movement restricting wall. Therefore, the sensor can be temporally placed on the movement restricting wall, and, from that state, it is possible to easily detach the sensor from the sensor bracket.

(2) In the aspect of the above mentioned (1), a groove that allows removal of the engaging protrusion downward may be provided at a position adjacent to the locking concave section below the displacement allowing section, and the movement restricting wall may be provided so as to be adjacent to a side of the groove which is opposite to the locking concave section.

In the case of the aspect of the above mentioned (2), when the sensor is detached from the sensor bracket, if the engaging protrusion is displaced suddenly from the locking concave section in a direction toward the displacement allowing section, the engaging protrusion gets placed on the movement restricting wall by passing over the groove and the sensor is temporally placed on the sensor bracket. From this state, by moving back the engaging protrusion of the sensor to the upper position of the groove, the engaging protrusion is aligned with the position of the groove and it is possible to detach the sensor from the sensor bracket.

(3) In the aspect of the above mentioned (2), the sensor bracket may include a biasing member that biases the engaging protrusion toward the locking concave section from a side of the displacement allowing section.

In the case of the aspect of the above mentioned (3), the above mentioned configuration of the present application can have a configuration especially effective with respect to a falling prevention of the sensor.

That is, in the configuration of the aspect of the above mentioned (3), when the sensor is detached from the sensor bracket, the engaging protrusion is displaced until the displacement allowing section against the biasing force of the biasing member. Therefore, when the movement restricting wall is not provided, for example, when the biasing force of the biasing member is released and the like by pushing the sensor against the biasing force of the biasing member, the possibility in which the sensor is suddenly removed downward increases. However, when the movement restricting wall is provided, it is possible to suppress this sudden removal of the sensor.

According to the aspect of the present invention, since the movement restricting wall that suppress the downward movement of the engaging protrusion when the engaging protrusion is displaced during the separation from the locking concave section is disposed below the displacement allowing section, it is possible to easily perform the attachment/detachment work of the sensor without concerning a sudden removal of the sensor.

DESCRIPTION OF EMBODIMENTS

Figure 1:
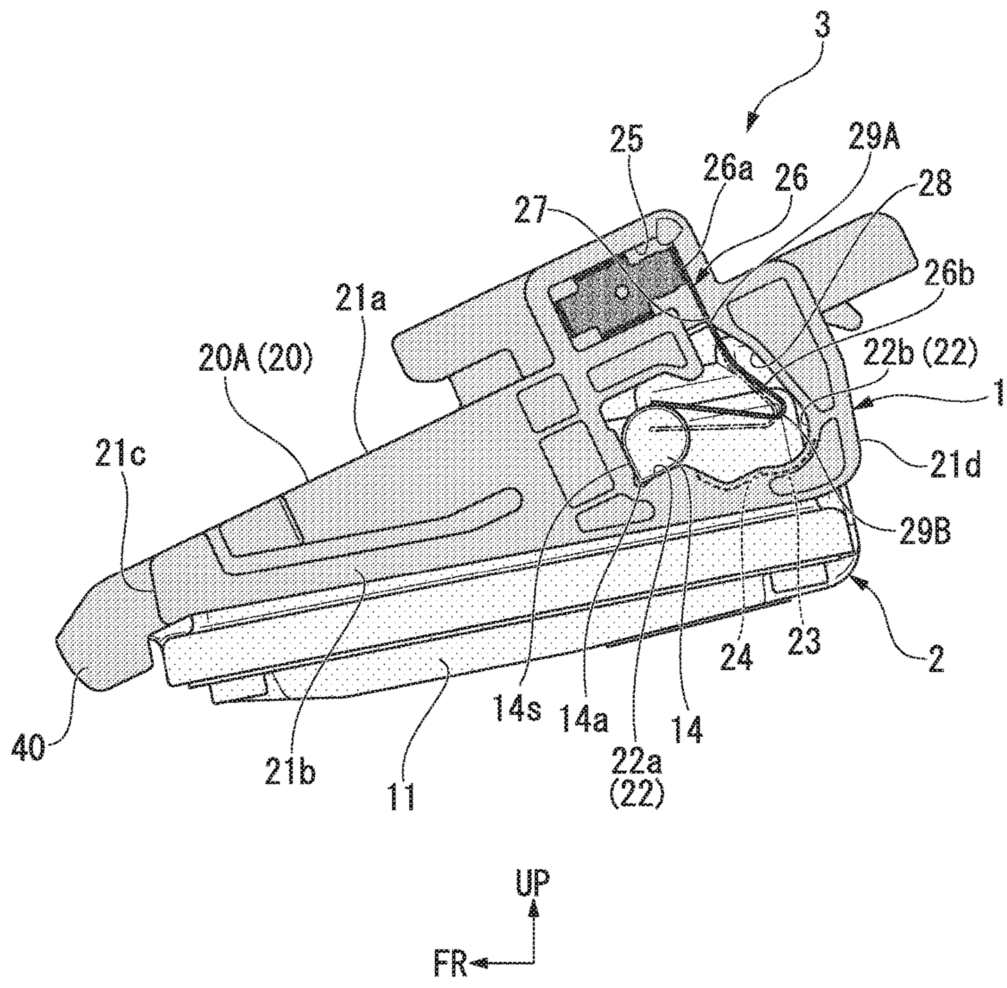
FIG. 1 is a side view of an assembly of a sensor bracket and a sensor according to an embodiment of the present invention.

Hereinafter, an embodiment of an aspect of the present invention will be described with reference to the accompanying drawings. Further, directions of forward, rearward, leftward, rightward, and the like shown below are the same as directions in a vehicle to which a sensor and a sensor bracket are attached described below unless the context clearly indicates otherwise. In addition, in appropriate places in the drawings used in the following description, an arrow FR showing a forward direction with respect to a vehicle, an arrow UP showing an upward direction with respect to a vehicle and an arrow LH showing a leftward direction with respect to a vehicle are provided.

Figure 2:
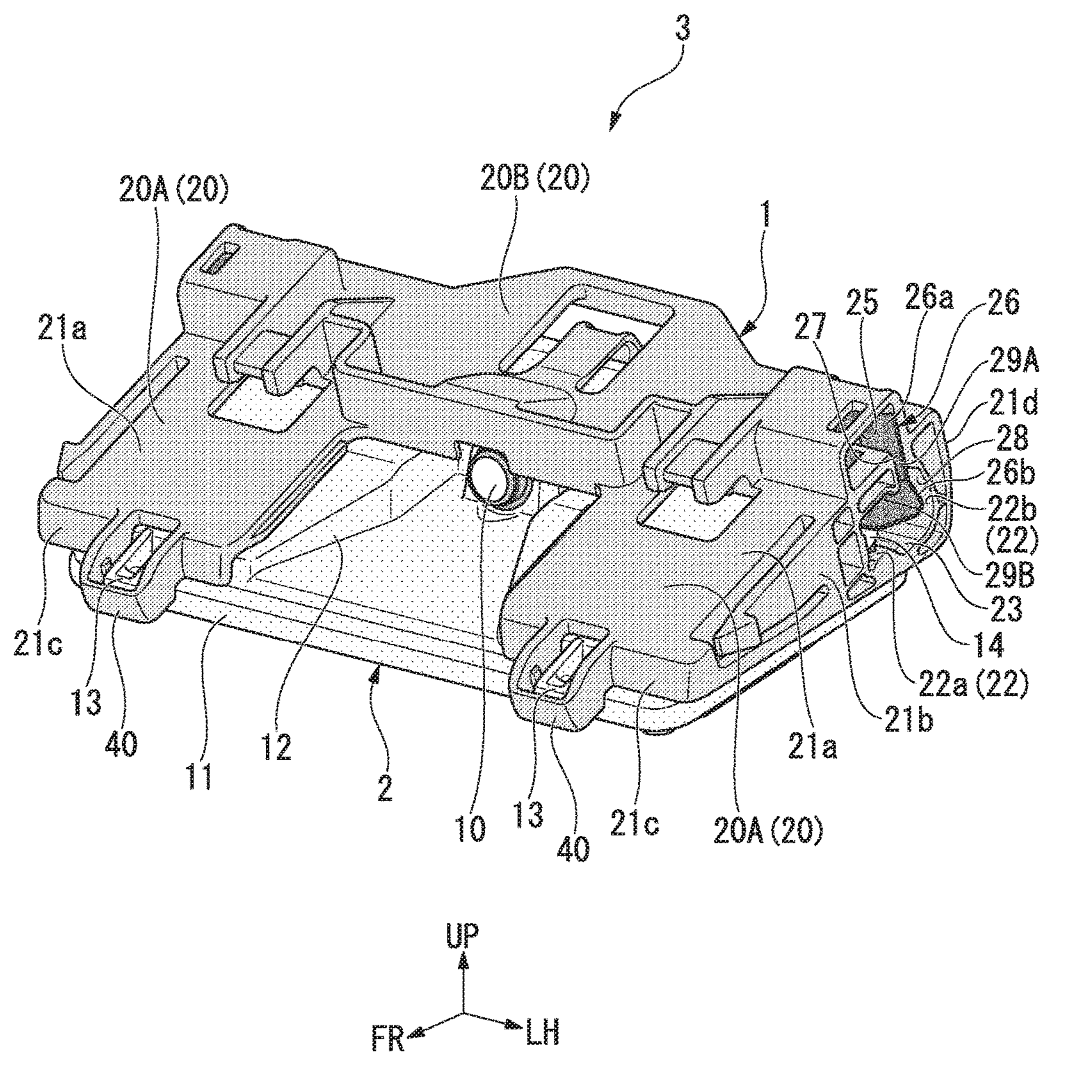
FIG. 2 is a perspective view of the assembly of the sensor bracket and the sensor of the embodiment of the present invention.

FIG. 1 is a view showing a left side surface of an assembly 3 of a sensor bracket 1 and a sensor 2 according to an embodiment, and FIG. 2 is a view showing the assembly 3 from a left upper side of a front section thereof.

In the embodiment, an on-vehicle camera attached to an inner surface of a glass windshield (not shown) is configured as the sensor 2. The assembly 3 is attached to the glass windshield such that a lens section 10 serving as a detection unit of the sensor 2 is directed to a side in front of a vehicle.

Figure 3:
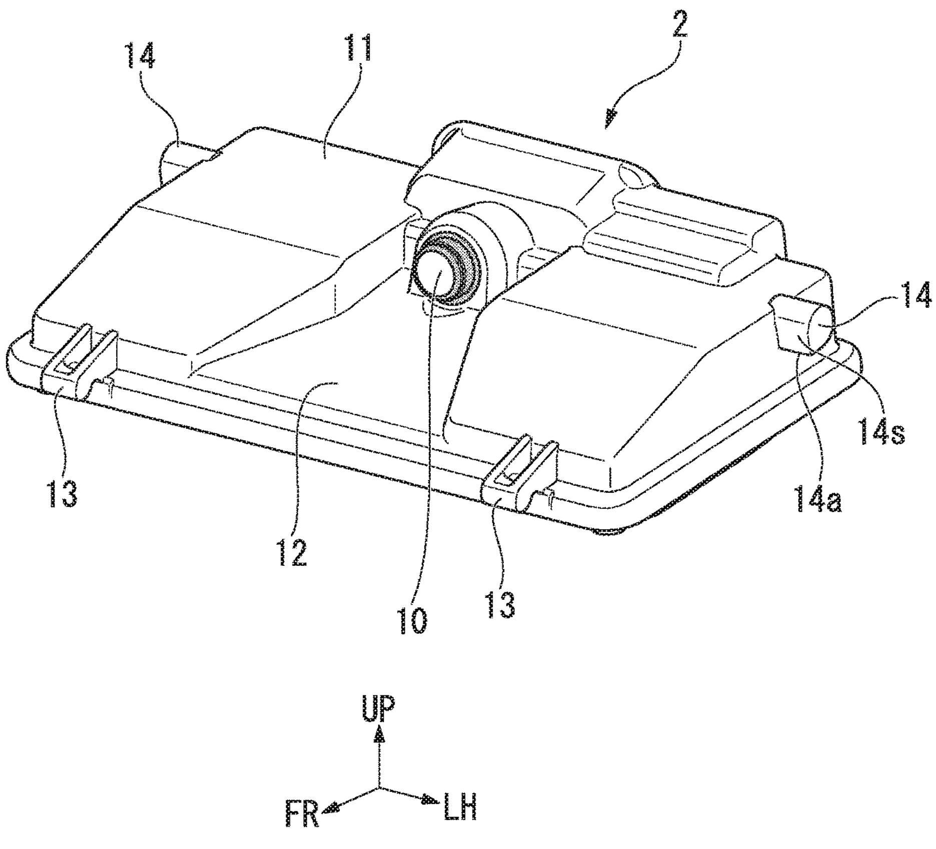
FIG. 3 is a perspective view of the sensor according to the embodiment of the present invention.
Figure 4:
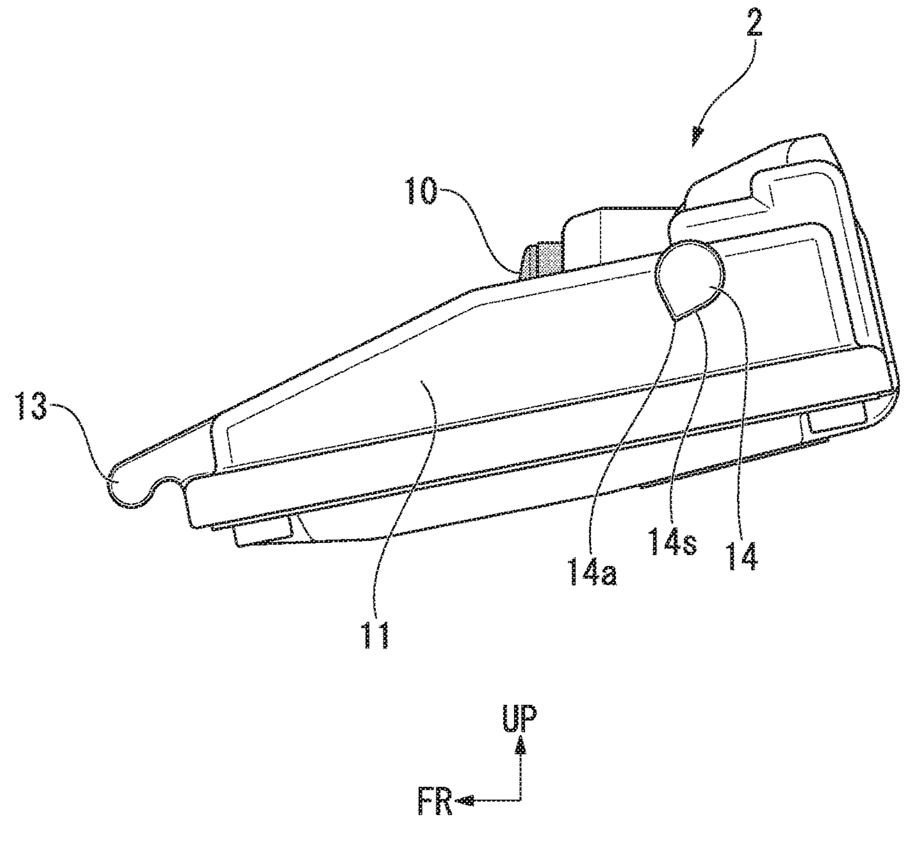
FIG. 4 is a side view of the sensor of the embodiment of the present invention.

FIG. 3 is a view showing the sensor 2 from a left upper side of the front section, and FIG. 4 is a view showing the sensor 2 from a left side.

The sensor 2 is disposed such that the lens section 10 is directed toward the front at substantially a center of a sensor body 11 having a substantially rectangular shape when seen in a plan view in a widthwise direction. A concave section 12 configured for opening the side in front of the lens section 10 is formed on an upper surface of the sensor body 11. Engaging claws 13 configured to lock a front edge portion of the sensor 2 to the sensor bracket 1 protrude from two positions spaced apart from each other on the front side of the sensor body 11 in the left and right direction. In addition, engaging protrusions 14 configured to lock a rear section of the sensor 2 to the sensor body 11 protrude from positions near the upper rear end of each of left and right side surfaces of the sensor body 11. The engaging protrusions 14 are formed in irregular circular cross-sectional shapes in which substantially right-angled corner sections 14*a* are formed to protrude at parts of the circular shapes, respectively.

Figure 5:
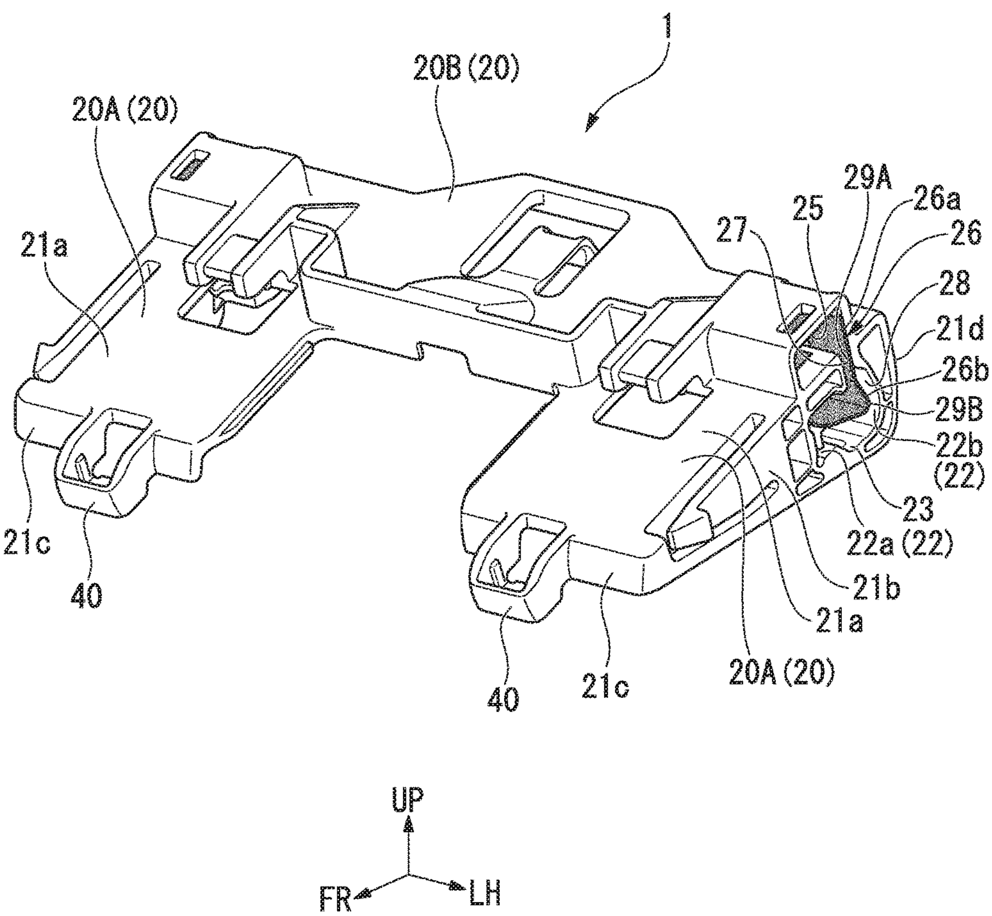
FIG. 5 is a perspective view of the sensor bracket of the embodiment of the present invention.
Figure 6:
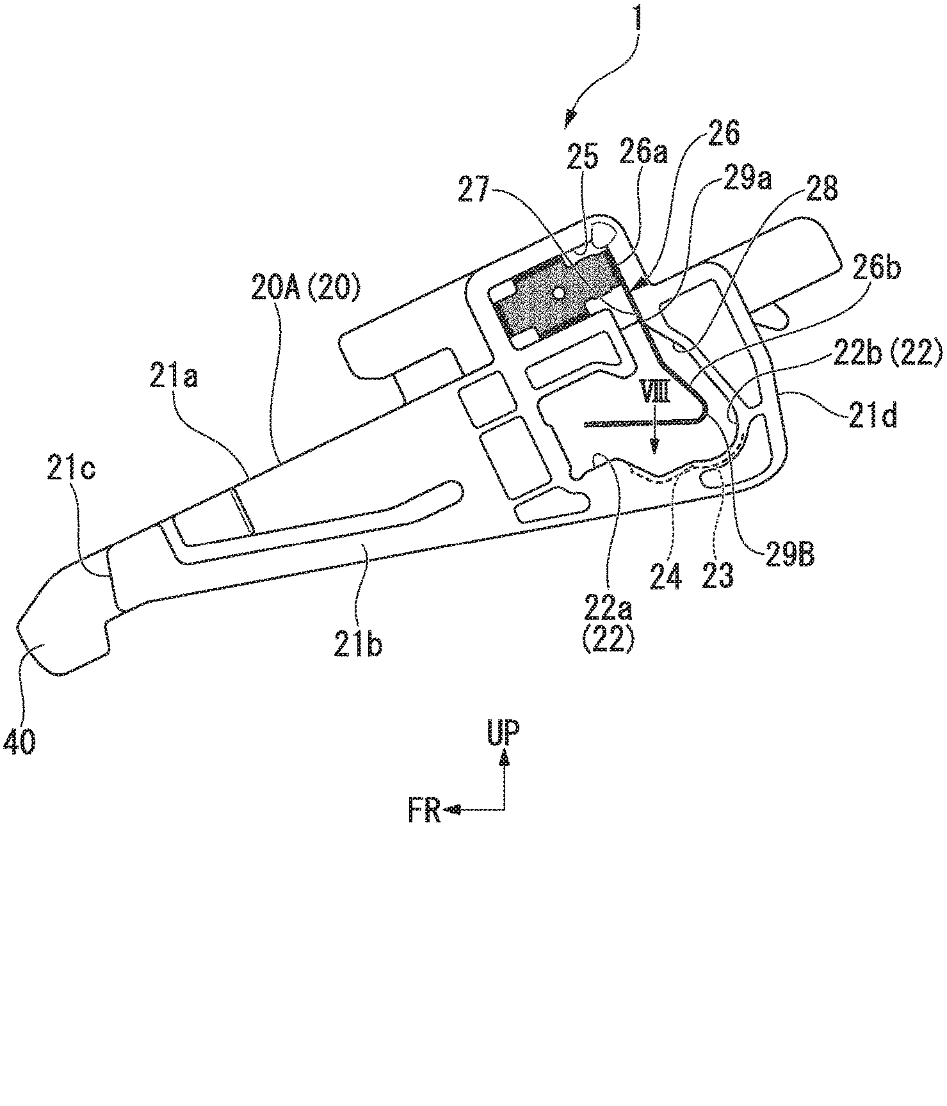
FIG. 6 is a side view of the sensor bracket of the embodiment of the present invention.

FIG. 5 is a view showing the sensor bracket 1 from a left upper side of the front section, and FIG. 6 is a view showing the sensor bracket 1 from a left side.

The sensor bracket 1 has a pair of left and right main support block sections 20A configured to cover left and right side edge regions of the sensor body 11 from above, and a connecting block section 20B configured to connect rear edge portions of the pair of main support block sections 20A. These sections are integrally formed of a resin material or the like. Each of the left and right main support block sections 20A has an upper wall 21*a* configured to cover an upper surface of a side region of the sensor body 11, a sidewall 21*b* configured to cover an outer side surface of the sensor body 11, and a front wall 21*c* and a rear wall 21*d* configured to cover a front surface and a rear surface of the sensor body 11. The left and right main support block sections 20A are formed symmetrically to each other, and the same functional parts are assembled thereto. In addition, the connecting block section 20B covers a rear region of the sensor body 11 at substantially a center in a widthwise direction from above. Imaging parts (not shown) connected to the lens section 10 are received in the rear region of the sensor body 11 at substantially the center in the widthwise direction.

In the embodiment, the left and right main support block sections 20A and the connecting block section 20B constitute a major part of a bracket main body 20.

Substantially rectangular restriction frame sections 40, into which tip portions of the left and right engaging claws 13 on the side of the sensor 2 are inserted from below a rear section thereof, are formed to protrude from the front wall 21*c* of the main support block sections 20A. Relative forward displacement of the front section of the sensor 2 with respect to the sensor bracket 1 is restricted when the tip portions of the engaging claws 13 abut front walls in the restriction frame sections 40.

Further, while the structure in which the tip portions of the engaging claws 13 abut the front walls in the restriction frame sections 40 is provided in the embodiment, the tip portions of the engaging claws 13 may not abut the front walls of the restriction frame sections 40.

Assembly holes 22 laterally passing through the sidewalls 21*b* are formed in rear regions of the sidewalls 21*b* of the main support block sections 20A. Upon assembly of the sensor 2 and the sensor bracket 1, the engaging protrusions 14 of the sensor 2 are disposed in the assembly holes 22. Each of the assembly holes 22 has a locking concave section 22*a* with which a side surface 14*s* of the engaging protrusion 14 (a side surface crossing a protruding direction of the engaging protrusion 14) abuts and is locked, and a displacement allowing section 22*b* formed adjacent to the locking concave section 22*a*.

Further, in the embodiment, the assembly holes 22 including the locking concave sections 22*a* and the displacement allowing sections 22*b* constitute a displacement allowing chamber.

Figure 7:
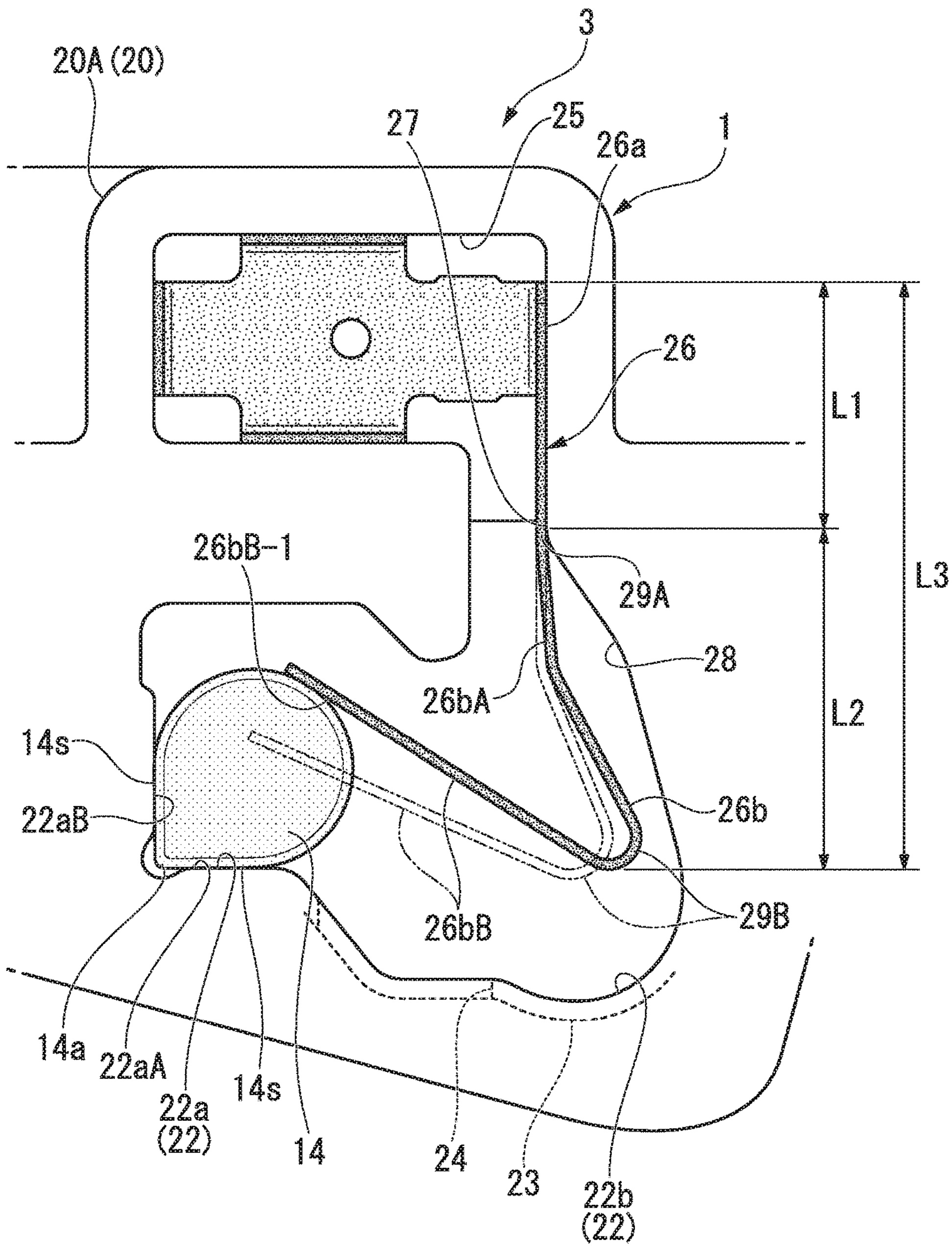
FIG. 7 is an enlarged side view of a portion of the assembly of the sensor bracket and the sensor of the embodiment of the present invention.

FIG. 7 is an enlarged view showing an assembly of the assembly hole 22 on the side of the sensor bracket 1 and the engaging protrusion 14 of the sensor 2.

As also shown in FIG. 7, the locking concave section 22*a* is disposed in a front lower end region of the assembly hole 22. The locking concave section 22*a* has a first locking wall 22*a*A, which is flat, extending linearly from a front end portion to a rear side, and a second locking wall 22*a*B extending linearly upward from the front end portion of the first locking wall 22*a*A at substantially right angles with respect to the first locking wall 22*a*A. The first locking wall 22*a*A and the second locking wall 22*a*B are walls extending inward from the bracket main body 20 in the widthwise direction to be continuous to each other, and the side surfaces 14*s* of the engaging protrusions 14 on the side of the sensor 2 (flat portions of the side surfaces 14*s* that sandwich the corner section 14*a*) abut the above mentioned walls. The rear region of the sensor 2 is locked and fixed to the sensor bracket 1 when the side surfaces 14*s* of the engaging protrusions 14 abut the first locking wall 22*a*A and the second locking wall 22*a*B in a pressed state.

In addition, the displacement allowing section 22*b* has a lower side region extending rearward from the rear end portion of the first locking wall 22*a*A of the locking concave section 22*a* after being inclined downward, a rear side region standing upward from the lower side region, and an upper side region extending rearward from an upper side of the locking concave section 22*a*. Walls extending inward in the widthwise direction of the bracket main body 20 extend from a portion of the lower side region, and the rear side region and the upper side region. The displacement allowing section 22*b* is provided adjacent to the locking concave section 22*a*, and allows a displacement of the engaging protrusion 14 of the sensor 2 during the engaging and separating between the engaging protrusion 14 and the locking concave section 22*a* in a direction crossing with the protrusion direction of the engaging protrusion 14.

Figure 8:
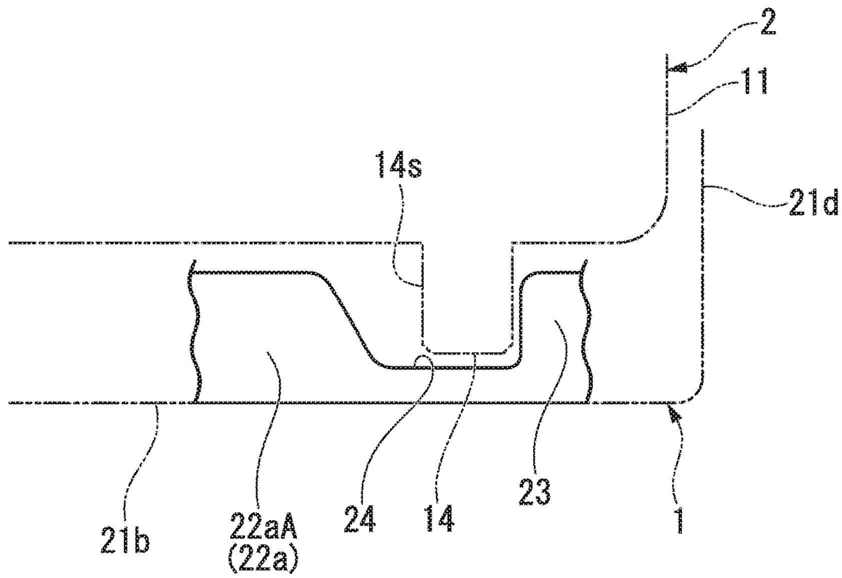
FIG. 8 is a view of the sensor bracket of the embodiment of the present invention taken along an arrow VIII of FIG. 6.

FIG. 8 is a schematic view showing the main support block sections 20A of the sensor bracket 1 from an arrow VIII of FIG. 6.

As shown in FIG. 8, a groove 24, that being adjacent to the first locking wall 22*a*A of the locking concave section 22*a*, that opening inside the main support block sections 20A in the widthwise direction and that having a predetermined forward/rearward width, is formed in a lower side region of the displacement allowing section 22*b*, and a movement restricting wall 23 is formed in the groove 24 on the side of the rear section. The movement restricting wall 23 is disposed below the displacement allowing section 22*b*. The groove 24 is a groove through which the engaging protrusions 14 of the sensor 2 can be inserted in an upward/downward direction. The sensor 2 can be assembled to or removed from the sensor bracket 1 when the left and right engaging protrusions 14 are aligned with the groove 24 corresponding to the sensor bracket 1 in the upward/downward direction. The groove 24 is provided at a position adjacent to the locking concave section 22*a* below the displacement allowing section 22*b*. The movement restricting wall 23 is provided so as to be adjacent to a side of the groove 24 which is opposite to the locking concave section 22*a*.

In addition, the movement restricting wall 23 of the lower side region is a wall disposed adjacent to the rear section of the groove 24, and configured to support the engaging protrusions 14 from below when the sensor 2 is removed from the sensor bracket 1 and the engaging protrusions 14 of the sensor 2 are moved behind the groove 24. The movement restricting wall 23 suppresses abrupt downward movement (removal) of the engaging protrusions 14 through the groove 24 when the sensor 2 is removed from the sensor bracket 1. The movement restricting wall 23 suppresses a downward movement of the engaging protrusions 14 when the engaging protrusion 14 is displaced during the separation from the locking concave section 22*a*.

Substantially rectangular concave sections 25 recessed inside in the widthwise direction are formed in upper sections of the assembly holes 22 of the sidewalls 21*b* of the main support block sections 20A. Plate springs 26 (biasing members) configured to press the side surfaces 14*s* of the engaging protrusions 14 against the first locking wall 22*a*A and the second locking wall 22*a*B of the locking concave section 22*a* are attached to the concave sections 25. Rear lower ends of the concave sections 25 communicate with the assembly holes 22. The plate springs 26 attached into the concave sections 25 extend into the assembly holes 22 through communicating sections thereof.

The plate springs 26 have base sections 26*a* attached in the concave sections 25, and deformation regions 26*b* disposed closer to the tip portions than to the base sections 26*a*. The deformation regions 26*b* have first extension sections 26*b*A extending downward from the base sections 26*a*, and second extension sections 26*b*B extending linearly toward an upper side of the front section after being bent in substantially a V shape at lower ends of the first extension sections 26*b*A. Tip regions 26*b*B-1 of the second extension sections 26*b*B abut the engaging protrusions 14 at the front surface side and elastically press the side surfaces 14*s* of the engaging protrusions 14 against the locking concave sections 22*a*.

Here, supporting point parts 27 that abut the vicinity of boundary sections between the base sections 26*a* of the plate springs 26 and the deformation regions 26*b* from rearward and that serve as deformation supporting points when the deformation regions 26*b* deforms in the vicinity of the base sections 26*a*, and concave sections 28 that are configured to allow bending deformation toward rear sides of the deformation regions 26*b* about the supporting point parts 27, are formed in rear side regions of inner walls of the assembly holes 22. The supporting point parts 27 are constituted by ridge sections extending in a leftward/rightward direction. The vicinity of the boundary sections between the base sections 26*a* and the deformation regions 26*b* of the plate springs 26 are bent and deformed by abutting with the supporting point parts 27. The bent and deformed portions constitute first bending deformation sections 29A according to the embodiment. In addition, folded sections between the first extension sections 26*b*A and the second extension sections 26*b*B of the deformation regions 26*b* are bent in substantially a V shape as an initial shape. The folded sections constitute second bending deformation sections 29B according to the embodiment.

In addition, a support section length L1 of the base section 26*a* of the plate spring 26 by the bracket main body 20 is set to be a length of a half or less than a half of a length L3 obtained by adding the support section length L1 and a length L2 which is a length from the first bending deformation sections 29A to the second bending deformation sections 29B.

Figure 9:
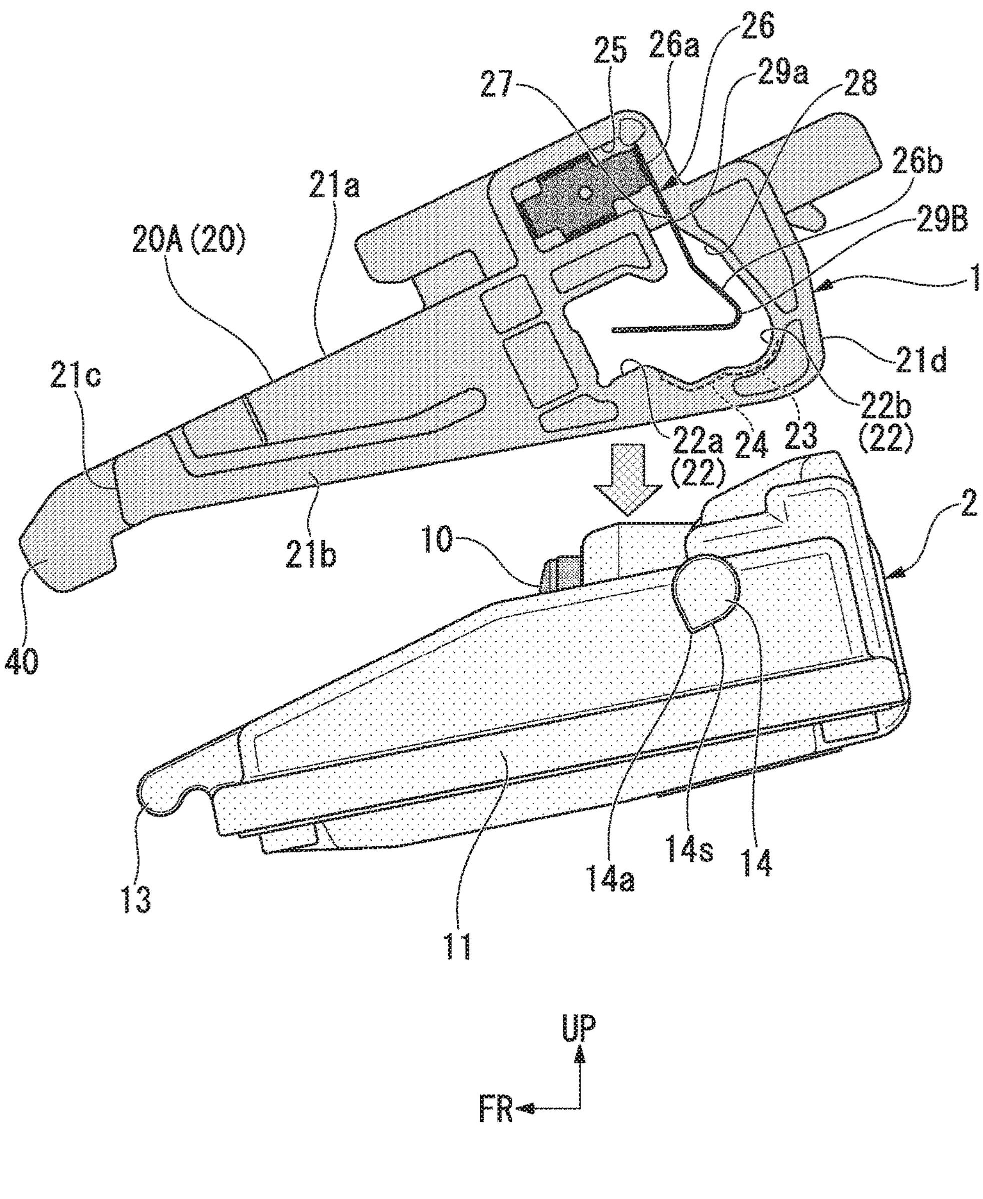
FIG. 9 is a side view of the sensor bracket and the sensor of the embodiment of the present invention.
Figure 10A:
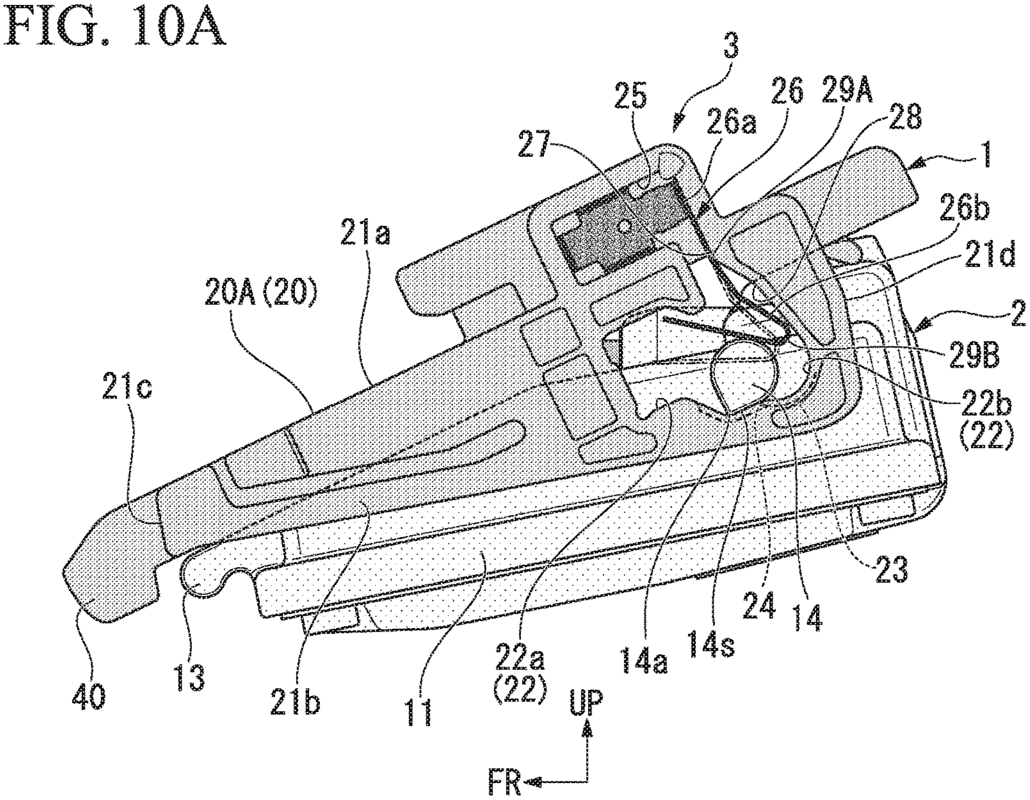
FIG. 10A is a side view showing an assembly sequence of the sensor and the sensor bracket of the embodiment of the present invention.
Figure 10B:
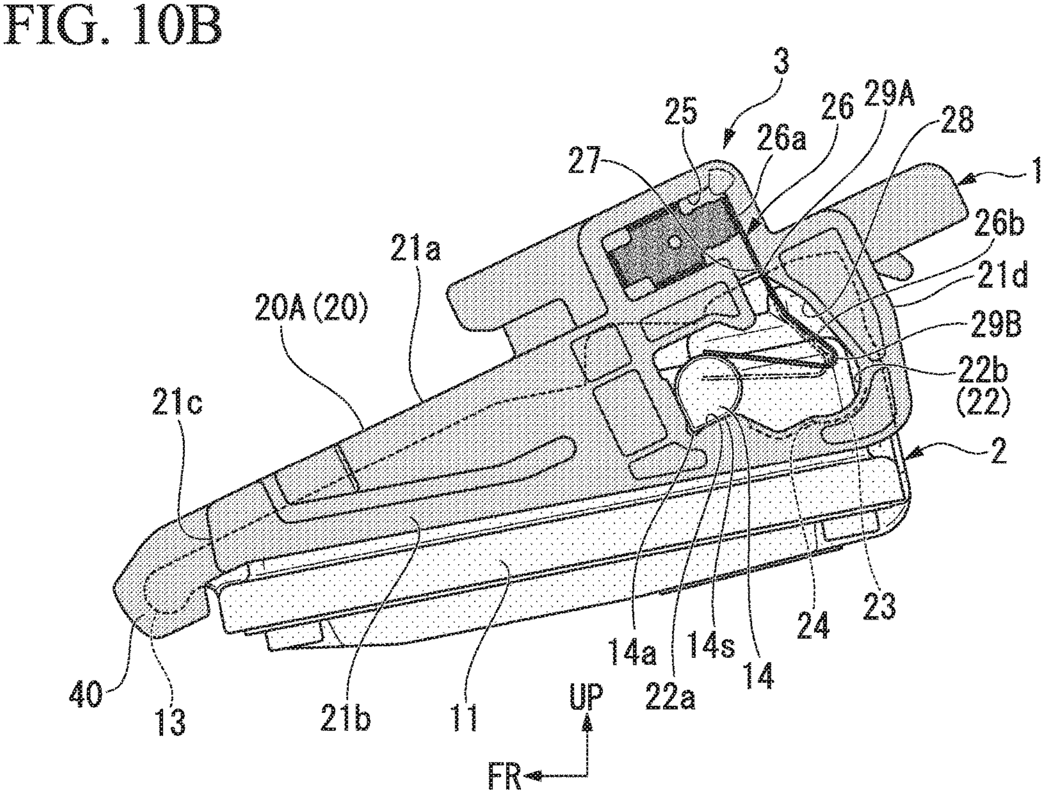
FIG. 10B is a side view showing the assembly sequence of the sensor and the sensor bracket of the embodiment of the present invention.

FIG. 9, FIG. 10A and FIG. 10B are views showing aspects when the sensor 2 and the sensor bracket 1 are assembled.

In actuality, when the sensor 2 and the sensor bracket 1 are assembled, the groove 24 (see FIG. 8) of the sensor bracket 1 on the front side of the movement restricting wall 23 is positioned to come over the left and right engaging protrusions 14 of the sensor 2, and in this state, the sensor bracket 1 covers and is attached to the upper section of the sensor 2. Accordingly, the left and right engaging protrusions 14 of the sensor 2 are inserted into the assembly holes 22 through the groove 24 corresponding to the sensor bracket 1 (see FIG. 10A). Here, the engaging protrusions 14 abut regions of plate springs 26 closer to the tips than to the second bending deformation sections 29B, and press the deformation regions 26*b* of the plate springs 26 toward a rear upper side. Accordingly, the plate springs 26 are bent and deformed at the first bending deformation sections 29A close to the base sections of the deformation regions 26*b* and the second bending deformation sections 29B that serve as folded sections.

Next, when the sensor 2 is displaced forward with respect to the sensor bracket 1 from this state, the engaging protrusions 14 of the sensor 2 slides forward over the first locking walls 22*a*A in the assembly holes 22 to abut the second locking walls 22*a*B of the locking concave sections 22*a* (see FIG. 10B). Here, the engaging protrusions 14 receive biasing forces of the plate springs 26 such that a state of being fitting to the locking concave sections 22*a* is maintained. Here, the engaging claws 13 of the front end portion of the sensor 2 are disposed in the restriction frame sections 40 corresponding to the sensor bracket 1. Assembly of the sensor 2 and the sensor bracket 1 is thus completed as described above.

In addition, conversely, when the sensor 2 is removed from the sensor bracket 1, the sensor 2 is displaced rearward against a biasing force of the plate springs 26 from a state shown in FIG. 10B to a state shown in FIG. 10A. Here, the engaging claws 13 on the side of the front section of the sensor 2 are removed from the inside of the restriction frame sections 40, and the left and right engaging protrusions 14 on the side of the rear section of the sensor 2 slide on the first locking wall 22*a*A in the assembly holes 22 to be displaced toward a rear side of the first locking wall 22*a*A. Here, since the sensor 2 is pressed by a worker against the biasing force of the plate springs 26, when the biasing force of the plate springs 26 is released at the time the left and right engaging protrusions 14 move onto the groove 24, the force of a pressing operation is abruptly increased. For this reason, if the movement restricting wall 23 is assumed to be absent on the rear side of the groove 24, there is a possibility that the sensor 2 may be rapidly removed downward from the groove 24 in a state the force is increased. However, in the sensor bracket 1 of the embodiment, since the movement restricting wall 23 is disposed in the vicinity of the rear side of the groove 24, when the force of the pressing operation is increased at the time the left and right engaging protrusions 14 move onto the groove 24, the left and right engaging protrusions 14 move rearward beyond the position of the groove 24 of the rear section of the first locking wall 22*a*A and are placed on the movement restricting wall 23 of the rear section of the groove 24. As a result, the sensor 2 is temporarily placed on the sensor bracket 1.

Next, the sensor 2 is moved forward from this state, the left and right engaging protrusions 14 of the sensor 2 move to an upper position of the groove 24 in front of the movement restricting wall 23, and the sensor 2 is pressed downward in this state. As a result, the sensor 2 is removed from below the sensor bracket 1.

As described above, in the sensor bracket 1 according to the embodiment, since the movement restricting wall 23 that suppress the downward movement of the engaging protrusion 14 when the engaging protrusion 14 is displaced during the separation from the locking concave section 22*a* is disposed below the displacement allowing section 22*b*, it is possible to easily perform the attachment/detachment work of the sensor 2 without concerning a sudden removal of the sensor 2.

In the case of the sensor bracket 1 according to the embodiment, a groove 24 that allows removal of the engaging protrusion 14 of the sensor 2 downward is provided at a position adjacent to the rear section of the locking concave section 22*a* below the displacement allowing section 22*b*, and the movement restricting wall 23 is provided so as to be adjacent to a side of the groove 24 which is opposite to the locking concave section 22*a* (rearward of the groove 24). Accordingly, when the sensor 2 is detached from the sensor bracket 1, if the engaging protrusion 14 is displaced suddenly from the locking concave section 22*a* rearward, the engaging protrusion 14 is received by the movement restricting wall 23 and the sensor 2 can be temporally placed on the sensor bracket 1. Therefore, by moving back the engaging protrusion 14 of the sensor 2 to the upper position of the groove 24, it is possible to stably detach the sensor 2 from the sensor bracket 2.

In addition, in the sensor bracket 1 according to the embodiment, the sensor bracket 1 includes a plate springs 26 that biases the engaging protrusion 14 toward the locking concave section 22*a* from a side of the displacement allowing section 22*b*. Accordingly, when the sensor 2 is strongly pressed back rearward against the biasing force of the plate spring 26 when detaching the sensor 2, the engaging protrusion 14 is received by the movement restricting wall 23 and it is possible to certainly suppress a sudden downward removal of the sensor 2 by the force pressing back the plate spring 26.

Figure 11:
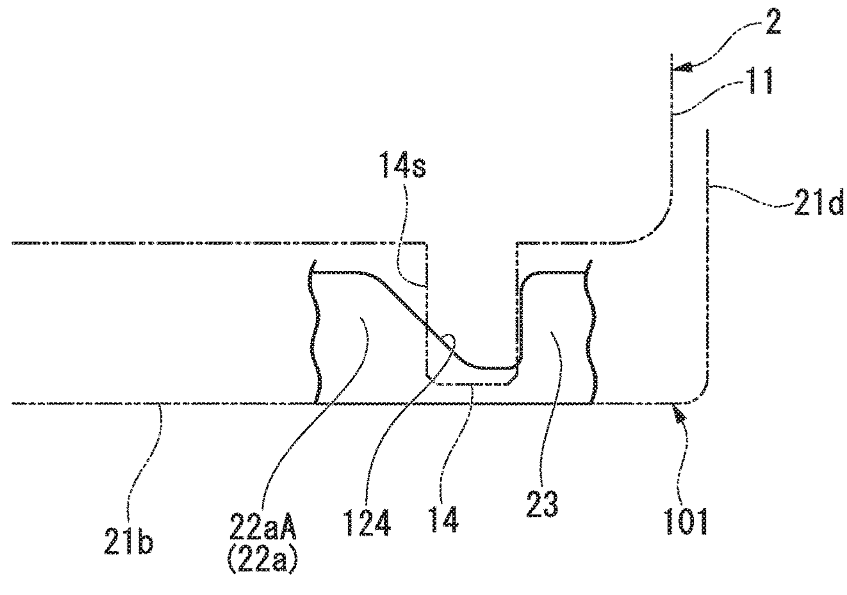
FIG. 11 is a view of a sensor bracket of another embodiment of the present invention taken along an arrow VIII of FIG. 6.

FIG. 11 is a schematic view of a sensor bracket 101 according to another embodiment similar to FIG. 8.

The sensor bracket 101 of the other embodiment is distinguished from the above-mentioned embodiment in that a shape and a size of a groove 124 formed between the first locking wall 22*a*A of the locking concave section 22*a* and the movement restricting wall 23 is different from those of the embodiment.

The groove 124 of the sensor bracket 101 has a notch-shaped groove, and when seen from above, an opening area that overlaps with the engaging protrusions 14 is set to be smaller than a projection area when the engaging protrusions 14 are projected on an extension section of the movement restricting wall 23. In the case of the embodiment, when the sensor 2 is assembled to the sensor bracket 101 or the sensor 2 is removed from the sensor bracket 101, by pressing the engaging protrusions 14 on the side of the sensor 2 against a portion of the groove 124, the groove 124 can be pressed and widened and the engaging protrusions 14 can pass vertically over a front side of the movement restricting wall 23.

In the case of the present embodiment, when the sensor 2 is detached from the sensor bracket 101, it is possible to more certainly suppress a sudden downward removal of the sensor 2.

Further, the present invention is not limited to the above-mentioned embodiment and various modifications may be made without departing from the scope of the present invention. For example, while the biasing member configured to bias the engaging protrusion is formed as a plate spring separate from the bracket main body in the above-mentioned embodiment, the biasing member may be formed integrally with the bracket main body.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A sensor bracket that holds a sensor having an engaging protrusion, the sensor bracket comprising:

a locking concave section to which a side surface of the engaging protrusion is locked in a abutting state, the side surface of the engaging protrusion being formed so as to cross with a protruding direction of the engaging protrusion;

a displacement allowing section that is provided adjacent to the locking concave section, and that allows a displacement of the engaging protrusion during engaging and separating between the engaging protrusion and the locking concave section in a direction crossing with the protrusion direction of the engaging protrusion; and a movement restricting wall that is disposed below the displacement allowing section and that suppresses a downward movement of the engaging protrusion when the engaging protrusion is displaced during separation from the locking concave section.

2. The sensor bracket according to claim 1, wherein a groove that allows removal of the engaging protrusion downward is provided at a position adjacent to the locking concave section below the displacement allowing section, and the movement restricting wall is provided so as to be adjacent to a side of the groove which is opposite to the locking concave section.

3. The sensor bracket according to claim 2, further comprising: a biasing member that biases the engaging protrusion toward the locking concave section from a side of the displacement allowing section.

* * * * *